US009046080B2

(12) United States Patent
Sliwa (10) Patent No.: US 9,046,080 B2
(45) Date of Patent: Jun. 2, 2015

(54) METHOD AND APPARATUS FOR REDUCING BIRD AND FISH INJURIES AND DEATHS AT WIND AND WATER-TURBINE POWER-GENERATION SITES

(76) Inventor: John W. Sliwa, Los Altos Hills, CA (US)

( * ) Notice: Subject to any disclaimer, the term of this patent is extended or adjusted under 35 U.S.C. 154(b) by 1970 days.

(21) Appl. No.: 12/156,062

(22) Filed: May 29, 2008

(65) Prior Publication Data

US 2008/0298962 A1  Dec. 4, 2008

Related U.S. Application Data

(60) Provisional application No. 60/932,066, filed on May 29, 2007.

(51) Int. Cl.
*F03D 11/00* (2006.01)
(52) U.S. Cl.
CPC ...................................... *F03D 11/00* (2013.01)
(58) Field of Classification Search
USPC ............ 416/1, 5, 23, 36, 61, 84, 93 R, 146 R, 416/247 R
See application file for complete search history.

(56) References Cited

U.S. PATENT DOCUMENTS

| 5,774,088 A * | 6/1998 | Kreithen .......................... 342/22 |
| 6,250,255 B1 * | 6/2001 | Lenhardt et al. ............... 119/713 |
| 6,623,243 B1 * | 9/2003 | Hodos .............................. 416/61 |

FOREIGN PATENT DOCUMENTS

WO   WO 2007038992 A1 *  4/2007

* cited by examiner

*Primary Examiner* — Nathaniel Wiehe
*Assistant Examiner* — Sean J Younger (57) ABSTRACT

A simple system is provided to dramatically reduce the number of bird fatalities and injuries, as these are bird-kills that man should be able to do something about. Essentially, the inventive apparatus comprises one or more instantaneously inflatable mini-airbags on turbine blade leading edges which, in the "stowed position" are tightly conformally elastically wrapped around or juxtaposed to the turbine blade surface(s) and/or edges(s) thereby not affecting the blade's aerodynamic efficiency. The airbag(s) can be activated and restowed or recollapsed very rapidly, thereby not significantly negatively impacting the operational efficiency of the wind machine. In a similar manner, fish-kills or injuries taking place in the turbine impellers of hydroelectric power-generator facilities may be avoided (as opposed to ameliorated) using another inventive system and method taught herein, this one being primarily a collision avoidance system which does not require the problematic alteration of the turbine blades themselves.

38 Claims, 4 Drawing Sheets

METHOD AND APPARATUS FOR REDUCING BIRD AND FISH INJURIES AND DEATHS AT WIND AND WATER-TURBINE POWER-GENERATION SITES

CROSS-REFERENCE TO RELATED APPLICATION

The present application claims priority from provisional application Ser. No. 60/932,066, filed May 29, 2007.

BACKGROUND ART

Wind-power windmills are known to kill birds, particularly raptors and bats. The birds are killed when they fly into the path of the windmill blades. As an indication of the violence of some of these incidents, many of the birds suffer decapitation or instant and usually fatal loss of one or more wings or body portions. Although windmills are responsible for a tiny, tiny fraction of the total accidental bird-kills due to man (<<1%), most of which are due to vehicles and building structures, those killed by windmills have garnered virtually all the attention as they are so visible and they ironically happen while trying to do something environmentally favorable, i.e., generate wind power.

A search of the wind turbine prior art reveals that most inventors in this field have tried to solve the problem by moving away from large exposed two and three blade windmills to windmills that are generally a lot smaller and have a variety of protective or air-funneling shrouds through which air passes but birds cannot, at least not easily. The trouble with these is that they generally are not as efficient as the existing large two and three bladed windmills such as the 5000 units at Altamont Pass in California. The suggested systems are indeed much more bird-safe but many, and perhaps all of them, are not as efficient as the current bird-dangerous large systems. Evidence of this simple fact is that the industry continues to build the current design in ever-larger numbers despite these alternative inventive designs being known. This is not to say smaller units are of no use; in fact, they may be ideal for home installations, for example.

I found two wind power patents which tried to address the bird-kill issue even for the existing base of large bare-bladed commercial power-generation windmills. These are as follows:

U.S. Pat. No. 6,623,243 to Hodos; "MINIMIZATION OF MOTION SMEAR—AN APPROACH TO REDUCING AVIAN COLLISIONS WITH WIND TURBINES". Hodos teaches that the visual image smearing of the rotor blades can be lessened or alleviated by painting a variety of optical patterns on one or more of the rotating turbine blades. The present inventor understands that this approach has been, or is being, tried at Altamont Pass, Calif. but I am not aware of any published results. Many raptors (hawks, eagles, etc.) are killed while diving near the ground to catch rodents. It is thought by some that during this attack-phase at low altitude, the raptor is not paying attention to anything but the rodent, seemingly a reasonable assumption. This would seem not to bode well for the hope that the bird or raptor will be noticing (better) the painted or patterned blades. Further, and certainly less important, depending on the pattern and colors, humans might find such visual colorations and patternations disagreeable. It is also not clear how well such a visual strategy can work at night.

US 2005/0162978 A1 to Lima, "METHOD OF INCREASING AVIAN SAFETY IN AND AROUND WIND POWERED ELECTRICITY PRODUCTION FACILI-TIES". Lima utilizes ultrasonic sounds to drive away the birds. Once driven away, motion detection sensors allow the ultrasonic speakers or annunciators to remain off until another bird is motion-detected. In that manner, the birds do not become conditioned to an always-on sound. The present inventor is not aware of such a system being tried. Some concerns regarding the reliability and efficacy of such a system are 1) motion detectors have a lot of false alarms due to moving branches, grass, etc., and some approaches such as video-motion detection can be confused or blocked by weather, 2) other windmills will generate a lot of motion signals which would need to be discounted, 3) the ultrasonic signal may also be irritating to other natural life such as rodents and insects, and maybe even humans, 4) the ultrasonic signals may be injurious or harmful to bird hearing if they are loud enough to be irritating, 5) birds flying into the area, such as on a migration journey, will represent significant daily numbers of "untrained" birds, so the ultrasonics may have to be on all or most of the time, thereby teaching resident birds there is nothing to be afraid of.

In any event, both of the above patents/apps are competent and well intentioned proposed solutions. They both are argued to act to avoid collisions which would seem to be the logical first choice over trying to ameliorate the severity of collisions.

DETAILED DESCRIPTION

Herein I propose a simple system to dramatically reduce the number of bird fatalities and injuries, as these are bird-kills that man should be able to do something about. Essentially, the inventive apparatus comprises one or more instantaneously inflatable components comprising inflatable membranes, inflatable bags or inflatable cushions (hereinafter referred to interchangeably as "inflatable components", "inflatable bags", "bags" or "airbags") on turbine blade leading edges which, in the "stowed position" or uninflated state are, in some embodiments, tightly, conformally, elastically wrapped around or juxtaposed to the turbine blade surface(s) and/or edges(s), thereby not affecting the blade's aerodynamic efficiency. The airbag(s) can be activated and restowed or recollapsed very rapidly, thereby not significantly negatively impacting the operational efficiency of the wind machine. Means to create airbag triggering signals, cause triggering, and cause restowing are taught as are a means to communicate the system's performance and a means to install it to work cooperatively on multiple turbines at a site.

In a similar manner, fish-kills or injuries taking place in the turbine impellers of hydroelectric power-generator facilities be avoided (as opposed to ameliorated) using another inventive system and method taught herein, this one being primarily a collision avoidance system which does not require the problematic alteration of the turbine blades themselves.

The present inventor is firstly providing a means of ameliorating the injuries sustained in collisions. A second effect and constituent of the invention operates to provide collision-avoidance. These may be used alone or together; in some embodiments, a layered avoidance/amelioration approach may be employed. My invention may certainly be utilized in combination with any other technique which avoids or ameliorates collisions. However, this inventor expects that no system can avoid all collisions without a serious cost relating to the windmill operation or without harming the wildlife in yet another new way, different from blade impacts (e.g., avian deafness, avian behavioral change, effects on other wildlife, effects on man, etc.). Thus, this inventor takes the view that a solution or solution component which substantially ameliorates the outcome of impacts which do happen is very valuable. Indeed, if collision avoidance approaches turn out to have unexpected consequences as mentioned above (assuming they otherwise work to some useful degree), there will be no other solution which provides both for maximal humaneness and otherwise environmentally sound and efficient energy generation. Wind power is intrinsically clearly a fantastic renewable energy resource, assuming we can implement it in an acceptable manner.

By "ameliorate" I mean that if X number of birds would have died, then X is reduced to a small fraction of X. If Y number of birds would have been critically injured, then Y is reduced to a fraction of Y. If Z birds would have sustained injuries which are not critical in nature, then that number Z can also be reduced to a small fraction of Z. The present inventor estimates that these reductions might be on the order of 70-75%, with proper execution of the invention herein. Of course, I am assuming that the inventive system herein does not introduce any unanticipated new injury mechanism whose numbers outnumber the original problem.

Essentially, I design an airbag system into/onto the windmill blades which is somewhat like human airbag systems in automobiles in some respects but not in others. We of course know that automotive airbags save numerous lives but not all lives, and that they prevent numerous devastating injuries but not all devastating injuries. The two main common themes between automotive airbags and wind turbine airbags are a) they cushion an impact over a large conforming surface and reduce injury severity and/or occurrence, and b) they need to be virtually instantly inflated to do any good at all. By "large conforming area" I mean an area that is typically both larger and more conformal that the unprotected impacting surfaces.

However, there are some major differences between our turbine airbags and automotive airbags as well. An aerodynamicist will say that placing an airbag on the rotating vane or turbine blade, whose tip may be doing 100 miles/hour, is going to break the rotor blade due to drag, resulting vibration, blade loading and torques and/or unacceptably loads applied to the turbine gearing mechanism, as well as shredding the airbag. He/she is at least properly concerned. However, the present inventor inflates his turbine airbags for very short periods, on the order of a second or so, and can do so symmetrically on all the blades if dynamically advantageous. Further, the inventive turbine airbags are inflating primarily in the blade-forward direction where the bird is typically otherwise killed by blunt-force trauma, if not dismemberment. Because of this relatively unchanged swept cross-section, the airbags are not significantly increasing drag, nor for very long.

I utilize, in some embodiments, small low-cost pyrotechnic gas sources as are also reliably used for automotive airbags. Their advantage is a very, very few-millisecond inflation time. These pyrotechnic gas sources can be electrically or optically triggered and mounted in/on the blade in groups such that they last for an extended period if one is used per potential/actual impact event. We also utilize motion or proximity detection means such as motion-detecting video cameras to detect the birds. One very easy implementation, particularly in terms of software, is to mount the cameras on the windmill blades looking along each blade and utilizing the rotating blade essentially as a visual stationary reference object into which a (relatively) moving bird can be expected occasionally. Those that would argue that such cameras are too expensive or fragile are not aware that digital cameras/camera sensors are rapidly approaching the price of dirt, are becoming increasingly drop-resistant, and can even subtract out unintended scene motion (shaking) if desirable. Inventor believes that the concept of putting cameras on the blades may be useful for other types of amelioration and/or avoidance systems and it will be also be independently claimed below for such applications.

So, in operation, our visual motion-sensing or proximity motion sensing system will be utilized to automatically decide whether—and perhaps how fully—to pulse-inflate one or more airbag elements. One might consider, for example, having the amount of inflation being related to the relative velocity of bird and rotor and/or the apparent visually deduced mass of the bird. One may also fully inflate one or more airbags every incident.

My airbags are, in some embodiments elastic in nature such that when uninflated they assume a tightly wrapped conforming shape to the underlying rotor blade. This allows for a rapid deflation to a form which approaches that of a coat of paint with no airbag-material flutter. In other words there should be little or no aerodynamic penalty to smooth and efficient turbine operation and the impacting bird should be substantially protected because of several reasons:

1) While uninflated or unactivated there is virtually no aerodynamic perturbation offered by the uninflated conformed airbags and minimal opportunity for bag flutter
2) The airbags can be inflated and uninflated in a matter of about a second or less—the deflation typically being a lot longer than the inflation.
3) A thin-walled elastic airbag material will offer a hugely more gentle and conforming surface to collide with—no blade damage
4) The airbag inflation masks sharp blade edges (small radii) with far softer surfaces having much larger radii.
5) Even when inflated the blade swept area is only modestly increased, at worst, and for a very short time if so.

Although I include in the inventive scope inflating airbags with a pressurized gas source, that approach has the disadvantages of limited flow rates and the requirement for plumbing from the pressurized reservoir. With wind turbines if we put things on the blades that require connections to off board or off blade portions of the windmill hardware then that can greatly increase the cost of the solution. Thus, I prefer self-contained pyrotechnic electrically or optically fired gas-generators provided in groups wherein one or perhaps two or three are used each incident. This eliminates pipes and valves and complexity.

When I say that the airbag is recollapsed or deflated to again become "conformal" to the blade, I mean substantially conformal in terms of any lack of conformity causing a drag issue. A totally elastic membrane with large stretchability can be inflated and then deflated to a deflated state wherein it is still in elastic tension, thus causing it to be blade-conformal and unwrinkled. Note that a less elastic airbag material, even if it is conformal before its first inflation, might be recollapsed to a pseudoconformal state which includes some small wrinkles. The present inventor feels that such small wrinkles are not a significant aerodynamic issue and are more an issue if the wrinkles flutter and cause airbag fatigue/abrasion and ripping. The present inventor estimates that a small wrinkle is one whose wrinkle height (off the blade surface) is more than 1% or so of the blade thickness at that blade location. This criterion would certainly allow for minor wrinkles.

In an inventive embodiment, I wish to avoid the use of electrical slip-rings and rotating pneumatic or hydraulic couplings to couple hardware on the rotating blade(s) to the non-rotating world of the turbine tower and/or its local support equipment or facilities on the ground. In so doing, I anticipate the use of wireless data and logic manipulation, such as wirelessly transmitted imagery and logic signals. However, this has to be done in a way wherein any required delays or wait-states do not interfere with rapidly needed triggering decisions. One way to do this is to place all the decision making components on the blades and hardwire them and put the motion recognition software in firmware perhaps. This would avoid having to pass full dynamic imagery off blade. One might also choose to provide an electrical power generation means on the rotating blade/hub/shaft itself which utilizes the blade/hub/rotor motion to mechanically generate its own power. One might even utilize laser delivered power wherein an off board laser illuminates and onboard (rotating) photovoltaic cell. Obviously, the rotor surface itself could be used to generate photovoltaic power for this powering purpose.

In any event, it is not my aim to design a detailed communication system here. It is certainly possible to build, in a large number of ways, a rapidly responding trigger mechanism for airbag inflation which utilizes real-time or near real-time (within milliseconds, for example) video streams (images) or proximity detection (distance) signals. I include in my scope the use of physically tripped triggers such as having a thin tripwire or cord which the bird hits (or affects an electromagnetic field on in front of the blade causing bag inflation before the blade body impacts the bird. Such a trip wire would be stretched along a line in the air through which the blade is about to be swept. The wire would be supported by the blades and or rotor hub region. The wire itself may offer some physical protection to the bird as it is compliant.

In the spirit of a cooperative solution, one may provide system data and incident or near-incident images over a network to other interested or vested parties. In fact, it should be possible for the detection cameras (or additional cameras) to give emergency veterinary or other trained responders a very good idea of the bird type and injury type before they even arrive at the impact scene. Most bird impacts using the invention are expected to result in either no injury, temporary stunning, blackout or non-critical injury. Maybe, just maybe, it can prevent virtually all the deaths. I shall hopefully find out. It should be realized that this would constitute a very significant improvement from where we are now. It is, however, likely that the largest raptors will still suffer some broken wings, bones or head injuries, but that is instead of being killed outright. Such injuries are survivable with human care.

It is anticipated that the largest raptors, such as large eagles and hawks, present the most difficult challenge due primarily to their mass and wingspan. For these, a full inflation of the airbag(s) is probably required and the airbag must prevent any of the hard parts of the rotor blade from hitting the raptor's body. Below, I teach several airbag shapes in the figures which do this. Even a gently radiused airbag may break large wings some of the time, again as opposed to the bird being killed out-right.

Ideally, the airbags are activatable (inflatable and deflatable) numerous times over the days, weeks or months. Assuming they can be fabricated as a dip molded latex or urethane-based sleeve, for example, on a dummy blade (or real blade at the bag factory preferably) then they can be made very cheaply and would be capable of being stretched or otherwise slid over the blade in the field. The present inventor regards it as highly advantageous that an airbag can be easily and quickly replaced in the field and that that operation does not require stoppage of the turbine for more than a few extra minutes (if any extra minutes assuming work is done in parallel) a month or quarter, when it is perhaps already being serviced.

I anticipate that occasionally a raptor or bird will puncture the airbag as with its talons or beak, intentionally or unintentionally. Such a small leak will probably not change the improved outcome for that bird; however, the bag may begin to tear upon one or more later inflation events or upon occasional stuck-bird removal from the bag. Thus, I anticipate an elastomeric dip-molded airbag material (or spray molded to a mandrel, for example) which ideally contains (placed in liquid solution) some tear-resisting micro or nanofibers and UV blockers. Carbon or Kevlar™ fibers might serve well for this. Within the scope of the invention is the system recognizing a bird stuck to a bag and the controlled deceleration of the blade to avoid further bird injury, and of course informing of a responder.

I mentioned above that the inventive system and method also have at least some beneficial collision-avoidance contribution in addition to its collision amelioration contribution. I now describe two such anticipated avoidance mechanisms whose action should prevent some collisions so the airbag possibly does not need to be inflated.

Recall that the relative closing speed of the bird and blade can be as high as 100 mph. This requires that the bag be inflated very, very quickly, in the milliseconds regime or faster. But an expanding bag surface inflating that fast is going to create a gust of wraparound wind in front of it and around its sides which additionally pushes the air-suspended bird away to some degree. Note that the inflating bag here has a distending surface actually moving at 100 mph of the blade plus (depending on relative directions) the even larger velocity of the bag inflation itself. For smaller birds and rapid full inflation at these blade velocities, this inflation/rotation airstream moving around the blade will be enough to avoid some collisions altogether. Unlike a child/airbag situation in an automobile where serious injuries can take place due to the airbag, the bird is suspended in the air and can be pushed ahead so the bag impact on the bird is significantly less severe. Birds are also somewhat tolerant of significant collisions as has been witnessed firsthand, where large birds are observed to fly into windows with a loud bang at high speed and immediately or quickly fly away, leaving a full dust imprint of every one of their splayed feathers on the glass.

A pulse inflated bag is not instantaneously inflated. Given that, the bird may be able to slightly alter its course and avoid some collisions simply because it heard and/or saw the airbag pyrotechnic flash and/or the inflating bag surface distending toward it. Within my inventive scope is the use of motion or proximity detectors to emit or activate one or more other types of bird warnings or bird repellants, such as sounds, lights, nozzle water sprays or air blasts, etc. The nozzle-based sprays of air or water could be rapid enough to physically cushion or repel the bird.

Within the inventive scope is any combination of the above collision amelioration and collision avoidance measures being mounted on one or more turbines at a site, whether or not they are all used for every near-miss and/or every collision and whether or not there is any turbine-to-turbine communication or shared data between the inventive systems.

I shall now discuss the four figures associated with the invention, three with the wind turbine application and a fourth with the water turbine application.

Figure 1A:
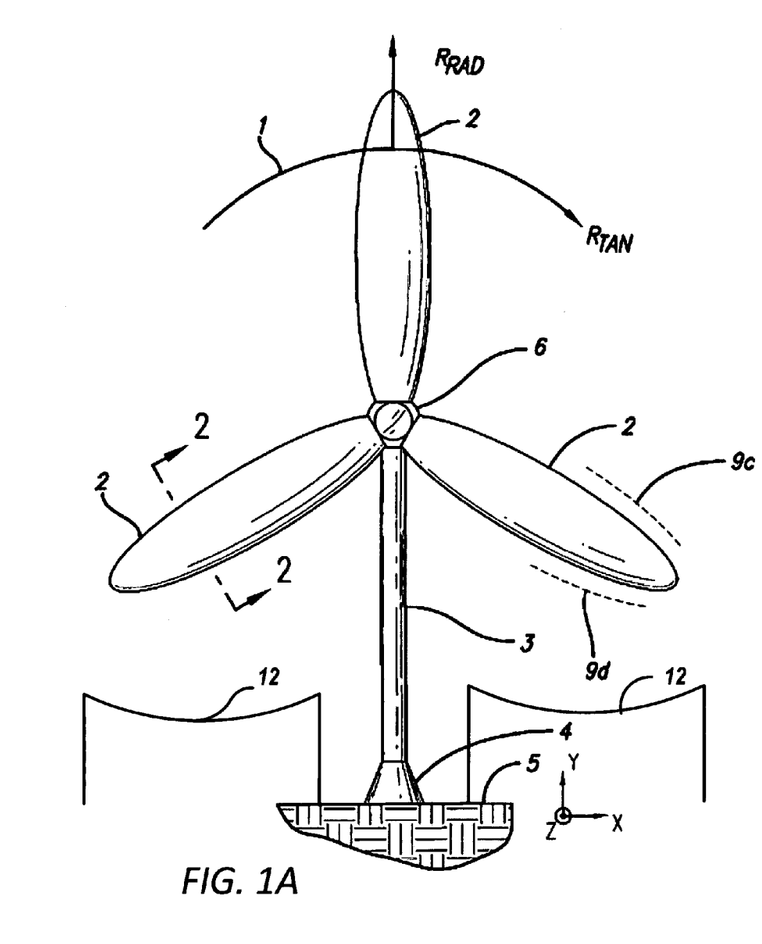
FIGS. 1A-1B depict, respectively, a front view and side view of a typical large wind turbine. A ground-mounted, wide-area, soft-impact catchment is shown beneath the blades.
Figure 1B:
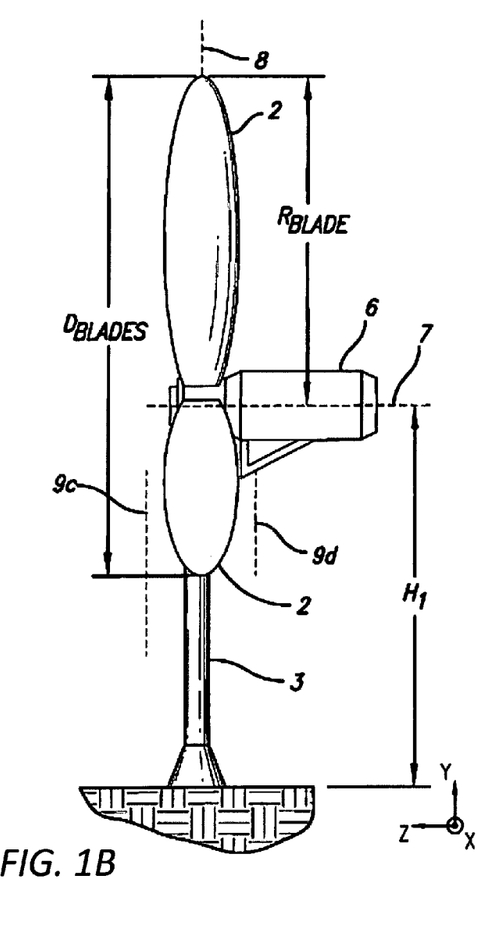

FIG. 1A depicts a front view and FIG. 1B depicts a side view of a typical large wind turbine 1 with three vanes or blades 2. The triple blades are mounted on a post or tower 3. The tower has a base 4 in/on the ground 5. In FIG. 1A, it can be seen that the blade structure is rotating clockwise and that each blade portion sweeps out a circular path indicated by $R_{tan}$. A single X-Y-Z coordinate system is shown in both views. An electrical generator 6 is shown mounted on the rotor centerline 7. Rotor hub or centerline is height $H_1$ off the ground 5. The overall diameter of the three bladed blade structure is of diameter $D_{blades}$. Some typical dimensions for real turbines, which are the primary object of the invention, are H in the range of 50-250 feet and D in the range of 70-200 feet. In FIG. 1A, I also show a section view 12 of a wide-area, soft-impact catchment that prevents further injury to struck birds that otherwise would make impact with the ground. This catchment can be as simple as a net or mesh suspended above the ground with a rectangular expanse that covers the area swept by the blades.

FIG. 1B depicts a reference plane 8 which is essentially the plane of the blades' rotation. Returning to FIG. 1A, note phantom lines 9c and 9d. These depict the avian's closure distance to the blade at which the airbag inflation will be triggered under one example operation setting. Note section 2-2 through one of the blades 2 in FIG. 1A. The $R_{rad}$ direction seen in FIG. 1A is the instantaneous radial direction of the blade at whatever angle it happens to be at. Finally, in FIG. 1B we see two phantom lines 9c and 9d. As for trigger lines 9c and 9d, these are triggering lines for a closing bird (closing relative to the blade, of course) in a plane orthogonal to the first in the blade plane. I note that the required triggering distance is, in fact, likely to be larger for blade portions moving faster, such as the blade tips. Thus, although not shown, the trigger lines 9c and 9d will be located essentially at the new blade position after a time delay, the time delay being approximately that necessary to make the triggering decision and to achieve useful inflation extent. I have not shown all possible locations for the airbags or any catchment netting on the ground or tower in this figure. For simplicity, a front view of a ground-mounted catchment net 12 is shown in FIG. 1A. It is a key optional component for catching birds after they are struck, if they are struck.

The Invention—Wind Turbines

Figure 2A:
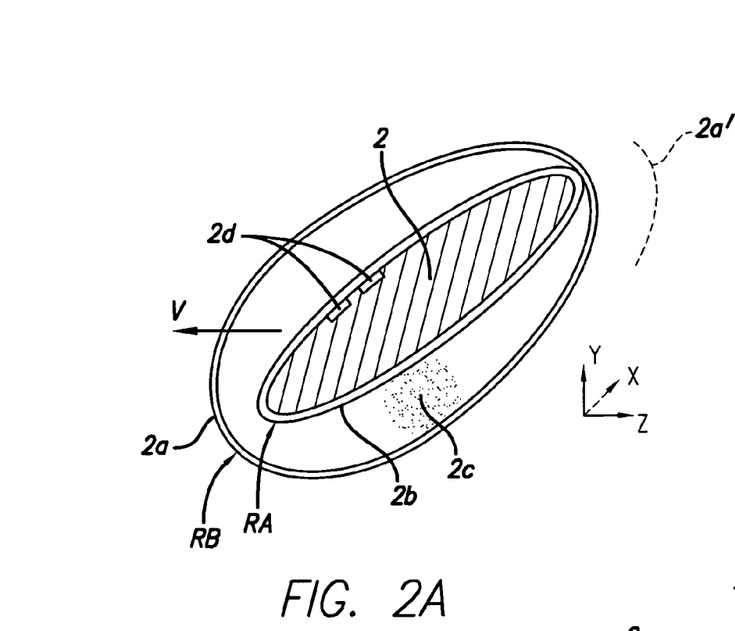
FIGS. 2A-2C each depict various sections 2-2 of the wind turbine blade from FIG. 1.
Figure 2B:
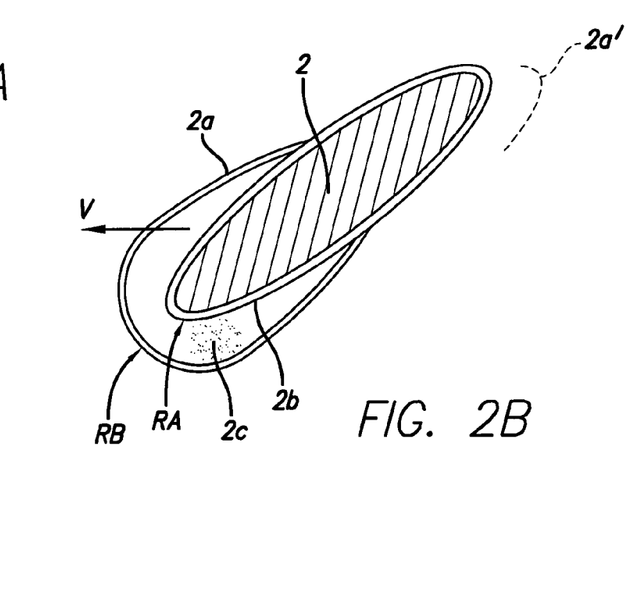
Figure 2C:
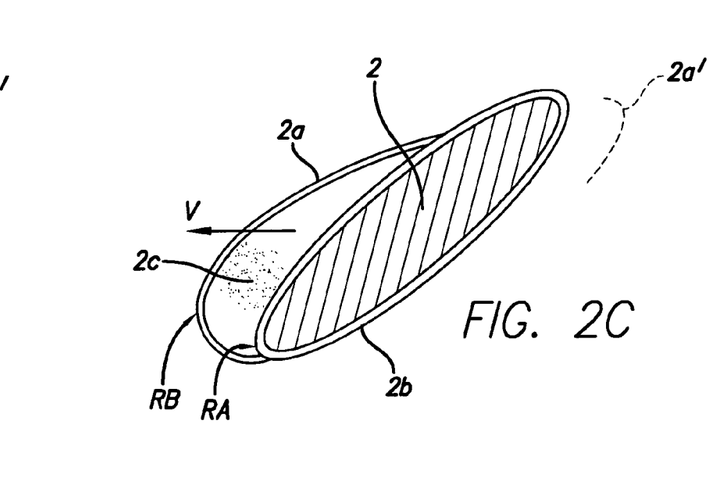

FIGS. 2A, 2B, and 2C illustrate various sections 2-2 of the blade as from FIG. 1A. These are sliced sections of the blade plus its overlying inflatable airbag looking along the blade/airbag toward the rotor hub 6/axis 7 as 2-2 indicates. There are three different variations of the section 2-2 in FIG. 2, namely those of FIGS. 2A, 2B, and 2C.

Note in each of the three sections FIGS. 2A, 2B, and 2C the same underlying blade 2 is depicted. What differs among the three sections 2-2 is the shape and attachment regions of the inflatable airbag 2b (which becomes inflated airbag 2a when inflated). In each of the three views, the inflated bag or bag portion is depicted as airbag or airbag portion 2a. In any event, the inflated airbag portion(s) 2a are inflated by a depicted gas 2c such as, in some embodiments, by a pyrotechnic gas-generator or, in other embodiments, by a pressurized gas source that emits its inflation medium to the airbag interior.

It will readily be noted that for all three airbag shape/attachment of FIGS. 2A-2C that the inflated airbag curvature radii are far less severe (more rounded or smoother) than the underlying radii of the bare blade 2 from the incoming bird's point of view. Specifically, refer to blade radii RA (or uninflated conformal bag-radii RA) in each of the three figures compared to the three somewhat different (from each other) but much larger inflated airbag radii RB. It will be obvious that the compressibility or conformability of the inflated airbag 2a to an impacting avian is also far higher than that of the bare hard blade 2. Finally, note that I have depicted local swept blade velocity vector V in each view. This velocity vector is essentially tangent to a circle that 2-2 blade portions sweep out in space. The important point is that the blade is moving in the velocity V direction (−X direction in FIGS. 1A/B and 2A-2C) so that is the leading-edge face on which most of the collisions with avians potentially or actually take place. I have shown former (in time) blade positions as phantom lines 2a' in each of the three subfigures 2A, 2B, and 2C. Because of this front-facing fact, I arrange for the uninflated inflatable-airbag 2b to inflate to a new inflated position 2a whose distended, inflated position is substantially displaced mainly (but not exclusively) along the velocity direction. In simpler terms, the most effective place for the inflated airbag 2a is on the front face and edges of the approaching blade so that the avian is shielded from all parts of the blade(s) 2. The reader will note that the inflated section variations of FIGS. 2A-2C all minimally increase the swept cross-sectional area of the blade, especially the smaller inflated structure of FIG. 2C. This means that there will not suddenly be a huge increase in aerodynamic blade drag and vibration and that, particularly if deflation is soon executed, that the blade rotor may not even have to slow down to avoid wind turbine and/or airbag damage.

I include in my inventive scope airbags 2b/2a which are reusable as well as single-use airbags. A single use airbag could be very, very light and thin (a few mils or less) and only survive long enough to cushion the bird. Even if it is then shredded with a few continued blade rotations, it has done its job. Some embodiments utilize a similar low-mass rapidly actuated airbag which can be deflated and used again later. I anticipate at least two generic types of airbag material. The first is an elastomeric material which substantially reversibly stretches as it inflates, the inflated shape being at least partly a function of the elastic bag properties and to some degree also its starting uninflated shape. The second is a less stretchable or low elasticity non-stretching material whose inflated shape is primarily determined by its uninflated shape. By "non-stretching" I mean neither elastic nor plastic strain. Allowing for permanent plastic stretching or strain in a bag presents the issue of how to restow it given its larger size and/or changed shape. This is not an issue for a single-use bag. Finally, a bag which is substantially unstretchable can also be provided that is initially folded such that it can assume an inflated shape much larger than or much different than its stowed or restowed shape. Any of these, given that we do not create aerodynamic significant or long-lasting aerodynamic drag problems, blade flutter or bag flutter is useful for the invention.

In any case, I believe that it is advantageous to protect the avian from the leading edges of the blades as well as the leading faces of the blades. So it will be noted in all three of FIGS. 2A-2C that the leading blade edge is masked or shielded by the inflated airbag portion(s) 2a. Looking at the same three subfigures, it can be seen that they vary as to the amount of cushioning provided from the blade lagging or following edge, the other edge of concern. An avian which is going to strike more toward the following edge than the leading edge will be "rolled off" the blade somewhat in the +Y direction by the blade and its overlying inflated balloon portions 2a. This rolling/sliding collision action is protective in itself compared to a totally blunt collision, particularly one with a sharp bare blade leading edge. Also note, particularly for FIGS. 2A and 2B, that a bird hitting the blade leading edge will deform the inflated airbag 2a (not shown) such that the airbag momentarily wraps itself around the back edge of the leading edge (impact induced wrapping not shown). This will further protect the avian from the leading blade edge if it slides or rolls in the X-Y plane.

In FIG. 2A, I depict a couple of pyrotechnic gas-generators 2d mounted on the blade surface. Ideally these will be mounted to the surface of the rotor or blade or near it but not require a blade cutout for such installation as that will complicate blade manufacturing and compromise blade reliability. However, within my inventive scope is locating the gas source anywhere and having plumbing or lumens of any sort running from source to blade. One may provide pyrotechnic gas generators in groups or arrays, one or more of which are fired for each airbag triggering event. Ideally, there will be a large enough group of gas-generators to last between regularly scheduled turbine maintenance sessions. One might also consider providing the gas inflators as an integral part of the exchangeable airbags. By "gas" I include any manner of gas or vapor and even liquids although their inflation times will be much slower and impractical in many wind turbine applications.

In FIGS. 2A-2C, I note that the uninflated airbag completely surrounds the blade 2 in its uninflated position 2b and that, depending on the Figure, some or all of it inflates away from the blade surface to become inflated airbag portion 2a. I stress that one could just as well, in the airbag noninflating regions, not provide airbag material but simply seal the edges of the distending airbag portion 2a to the blade surface such as to a low profile clamping slot or groove (this option not shown). This should make it clear that by "airbag" I do not always mean a completely closed tubular type sleeve; what is important is that whatever airbag portion I provide that it and its adjacent blade surfaces provide the needed closed or substantially closed gas cavity. Thus, a replaceable airbag can be a single-layer panel of airbag material whose edges are sealed to the blade or to a blade mounted clamping or seal system.

By "substantially closed" I mean that it closed enough or has a low enough leak rate that the inflation charge can still achieve useful protective inflation quickly enough. The reader will understand that some leak rate is tolerable while still doing this. Remember that in most of my implementations I want to deflate the airbag at some point. To do this requires a leak or vent. In the case of an elastomeric airbag which stretches to inflate, it will be appreciated that it can substantially self-deflate once the gas-generation stops if a purposeful leak or vent is present. In some embodiments, the elastic tension of the airbag membrane will cause the now uninflated airbag portions to become and remain relatively conformal to the underlying blade 2 in tension and to be relatively or completely unwrinkled. A non-elastic airbag which cannot stretch (elastically or plastically) must be provided with enough material such that it can essentially unfold its wrinkles or folds. Such a bag may be utilized as long as the stowed-condition wrinkles or folds do not present a bag fluttering or drag issue. Finally, an airbag which plastically or viscoplastically deforms, at least in part, can also be utilized. Like the elastic airbag, the inflated shape will be at least partly determined by the stretchability of the airbag material. If the plastic stretching is not recovered upon deflation one is presented again with the potential folding or wrinkling issue. Again, it is a matter of degree as to what constitutes a problem. I mentioned before that wrinkles (or folds) which remain small, say 1% of the blade thickness at that point, and do not flutter themselves to fatigue or ripping probably are tolerable. Within the scope of the invention are airbags stowed in/under the rotor surface, such as in shallow depressions or even covered containers. This can be particularly attractive for pleated bags which are intended to have a large expansion relative to their stowed size.

I ideally favor a mostly elastic very thin polymeric membrane or mesh of low mass and inertia whose leak rate is smaller, substantially, than the gas inflow rate—thus assuring inflation. Note that a fine mesh "airbag", although certainly leaky, may still be inflated because the incoming gas flow is so much higher than the leak rate. What matters is that for that short important moment of impact the bag is inflated.

Figure 3:
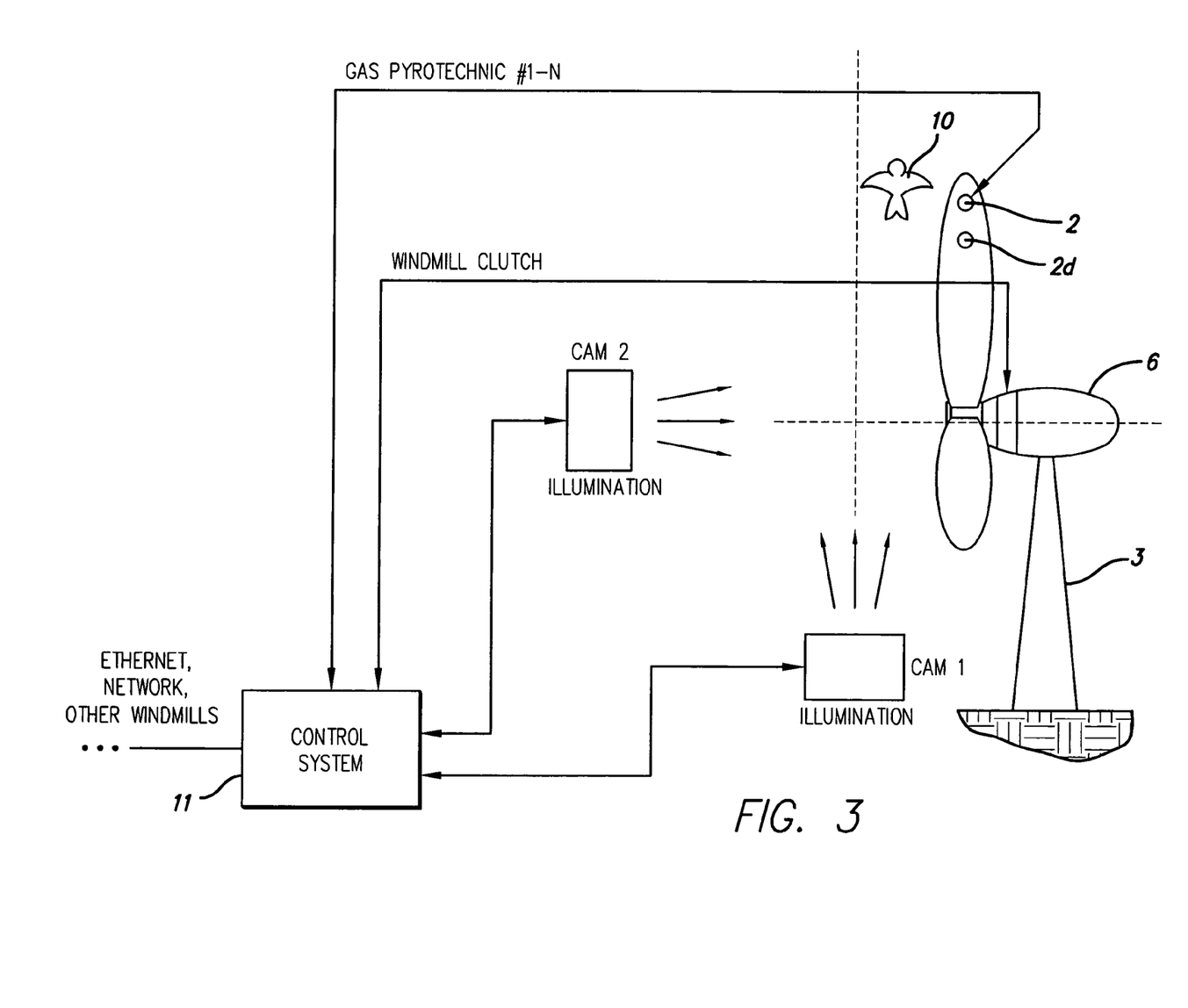
FIG. 3 depicts an overall schematic of the inventive wind turbine system and method.

Moving now to FIG. 3, shown is an overall schematic of the inventive wind turbine system and method. Therein a central control system 11 is seen which could include a PC, workstation, microcontroller or other logic means plus some solid state and possibly rotating memory, power provision elements and network interfaces. A side schematic view of a wind turbine is depicted in the upper right corner having the familiar blades 2, turbine generator 6 and tower 3. I also depict a couple of my pyrotechnic gas generators 2d mounted on a blade 2. A connection is shown running from the pyrotechnics 2d to the control system 11. This connection represents, collectively, any powering and/or communication (e.g., testing, triggering) that needs to be done to/from the gas-generators. There may be as many as N gas generators per blade. They will most typically be mounted on each blade as will be the airbags. Moving on, we note a windmill clutch/brake connection also connected to the controller 11. As mentioned earlier, the controller 11 may decide to slow or stop the windmill under some conditions, such as if a bird gets caught in an airbag. So this connection collectively represents not just a possible clutch connection but also a blade RPM controller connection, blade brake connection or blade pitch connection. One may favorably change the blade pitch before, during or after a potential or actual collision.

In FIG. 3 I also note collision or proximity detection means, in the depicted case being digital cameras labeled as cam1 and cam2. Note that between cam1 and cam2, one can deduce the three dimensional position of a blade and of a nearby avian. As I mentioned, I actually prefer to place the imagers or proximity detectors at least on the blades but I anticipate sites where blade mounted detectors will be aided by tower or ground mounted detectors, such aiding detectors possibly having views of multiple turbines. The invention may also, less preferably but still workably, utilize ground based (not attached to the windmill) cameras or sensors.

The control system 11 components may include one or more of a:

PC/microcontroller/workstation;
Solid state memory and rotating memory;
One of more user interfaces, such as GUIs and, in some embodiments, browser based;
Video networking for cameras or detectors such as GigE (gigabit Ethernet), CameraBUS, Firewire, CCTV or analog networks of the wired and/or wireless type;
Illumination controllers, with ground, rotor or tower mounted illuminators, of course;
Pyrotechnic firing means and testing means;
Airbag integrity testing means, possibly inflation status sensing means;

Clutch, brake, RPM and blade pitch monitoring and/or manipulation means;

Software for motion detection, distance detection, trajectory calculation, gas generator firing time calculation, bird species recognition, bird individual recognition, bird collision recording, bird near-collision recording;

Means to notify avian caregivers upon a collision, possibly including avian victim information;

Means to identify which turbine it is that is reporting;

Means to map or list collisions or near-collisions in response to a database query;

Means to report the activation of:
a) near-collision events where nothing (ameliorating or avoiding) was activated,
b) any event where avian irritating, frightening or repelling features were used,
c) near-collision events where avian irritating, frightening or repelling features were used,
d) any event where airbags were deployed, and/or
e) any event wherein (c) and (d) were utilized in combination or sequence;

Means to record, rate, compare, approve or disapprove of a turbine/system's performance; and/or Means to locally or remotely shut down a particular turbine/system which has repeated excessive short-term fatal collisions above and beyond an agreed level despite system use, or which violates an agreement or contract.

The wind turbines to which the inventive system and method are applied may be land based or water based. By "land-based" I include those on buildings. By "water-based" I include those anchored on the bottom, on platforms, on ships or barges, or fixed with sea-anchors.

The Invention—Fish and Water Turbines

The fish-protective system and method for water turbine applications, or for any other application wherein sea creatures are to be excluded or redirected from a path of travel or flow, is primarily an avoidance system. It prevents fish-turbine collisions thereby rendering it unnecessary to ameliorate fish-turbine collisions as few should happen. It still, however, may be used together with amelioration measures.

Figure 4:
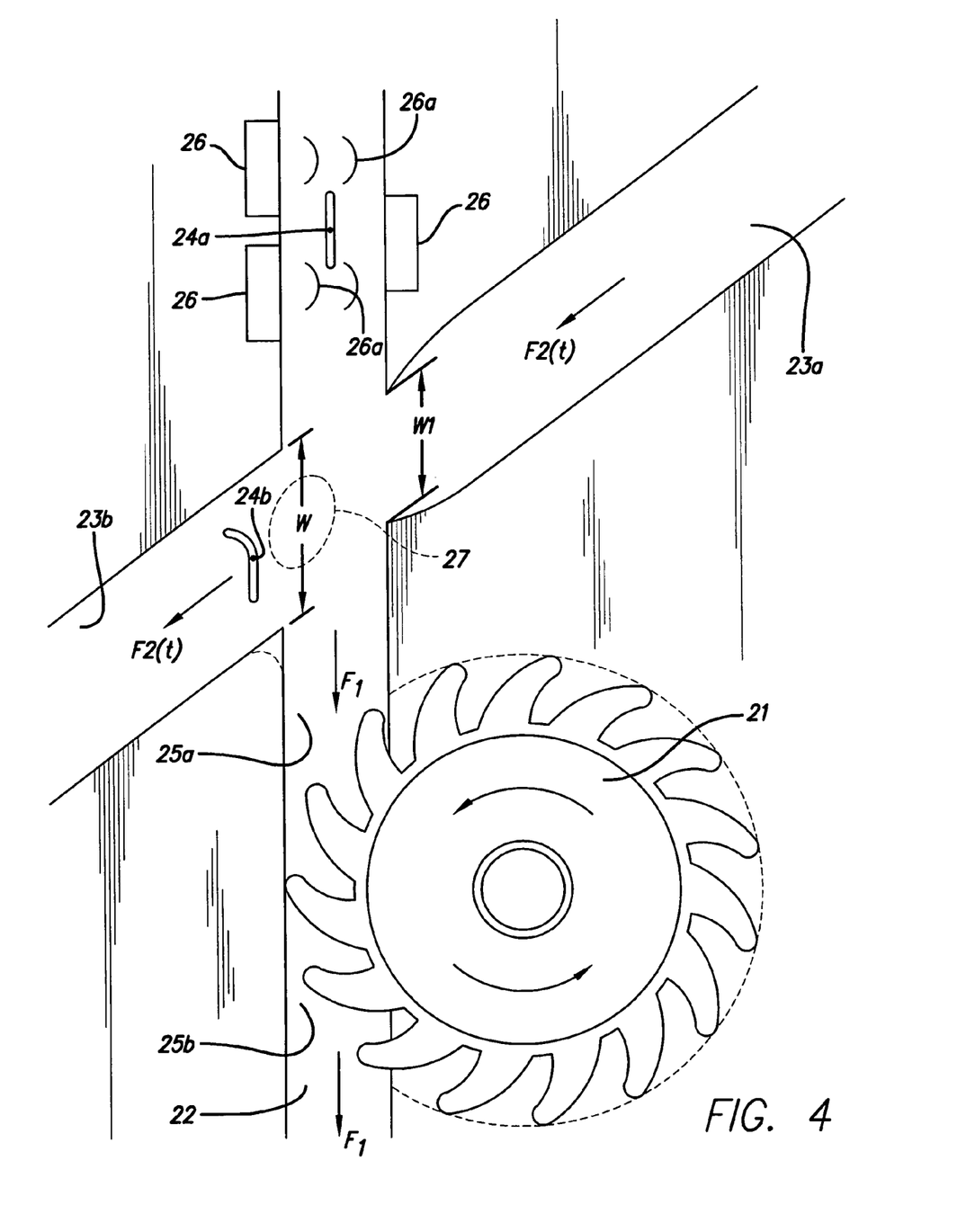
FIG. 4 depicts an embodiment of the present invention employing a water turbine.

Referring now to FIG. 4 we see a water turbine impeller 21 rotating counterclockwise and driven in rotation by a downward (in the drawing) flowing water stream in a conduit 22. Essentially the impeller 21 has blades or buckets which are pushed by the moving or impacting water. Typically, the incoming water will be sourced as from behind a dam; therefore, it will have a considerable head of pressure and have a high flow rate. Naturally, such conditions would appear not to be easily amenable to a fish-protection solution.

The incoming water in conduit 22 is flowing at a flow rate of F1. It will be noticed that I have placed a second flowable conduit 23a/23b across and intersecting the conduit 22 and it is shown as having an angle of about 45 degrees to conduit 22.

A fish 24a is depicted as being dangerously carried toward the impeller 21. The inventive solution is to utilize a cross-flow of water item F2(t) to laterally flush the fish 24a out of the main conduit 22 into a safe collection conduit 23b which is, in some embodiments, arranged to feed into a reservoir (not shown) from which the fish can be redirected or removed safely. Essentially, I send a pulsed flow of water F2(t) at the precise moment when the fish (now fish 24b at the conduit intersection) can be laterally flushed leftwards/downwards into safe catchment conduit 23b.

In current turbines, the fish may be killed or injured in any of several manners, including getting caught between moving parts, impacting the turbine blades or housing, being bodily wrenched, twisted or torn by large swirling or shearing currents or being hammered by a sudden and directional anisotropic pressure shockwave.

So it is necessary to keep the fish out or away from the turbine 21/conduit 22 chokepoints such as 25a and 25b. I do it by literally flushing the fish out of harm's way. One first needs a means to determine when to fire the flushing pulsed water flow. That comprises a fish detector system which in FIG. 4 includes several acoustic transducers 26 which can detect fish 24a inside conduit 22 by emitting acoustic waves 26a. The detector could also be optical in nature or even an imager, presuming there can be a useable optical path into and in the water flow. In most turbine facilities, the flow rate F1 of conduit 22 is constant, at least over periods of seconds. This means that a computer or PC can easily calculate at what time the fish, now fish 24b, will be in the right flushing position zone. The FIG. 4 fish 24b depicts an instant in time after the fish-flushing F2(t) has started so the fish 24b has already been moved somewhat laterally (primarily leftwards and somewhat downwards) into the catchment conduit 23b. One might also or instead equip the flushing zone itself with sensors which more or less immediately fire the flushing pulse as long as the fish remains in the safely flushable zone. The advantage of a more upstream fish observation (shown) is that one has more time to prepare, as necessary and advantageous, the total system for the event.

Next, I wish to note that the diameter or width (it does not have to be round) of flushing conduit 23a at width W1 is, in some embodiments, smaller or narrower than that of catchment portion 23b at larger width or size W2. This allows for some error in the timing of the flushing pulse F2(t), allows for some time for the flush to transport the fish 24b, and allows for the fish not being centered in conduit 21 before flush initiation. What is to be avoided is having the fish 24b strike the joining interior edges of conduits 22 and 23b in particular. Some embodiments have a flushing zone significantly larger than the fish itself. This allows for some tolerances and better assures that the fish will not be loaded unevenly. The phantom-line oval 27 depicts what a triggerable position for the fish would be, i.e., the flush zone.

The challenge here with the flushing dynamics is not to burst conduits 22 or 23a/23b or water-hammer the turbine 21 with a large pressure variation and damage it. So I first have arranged flushing conduits 23a/23b to be at an approximately 45 degree angle with conduit 22 as shown. This means that there will not be any large volume of water involved which is required to take an instantaneous 90 degree turn from conduit 21 into conduit 23a/23b, an energetically difficult and nearly impossible thing to do anyway. At any rate, for the depicted 45 degree arrangement, the most severe flow-angle change would be 45 degrees. This significantly reduces the peak pressure and flow variations required during flushing, as I am conserving some of the water's original momentum and using it to advantage.

Essentially, I inject a pulse of water from flushing conduit 23a at a rate and amount that both results in the fish's water surroundings to be slid or bodily ejected sideways while I avoid creating a (damaging) overpressure or underpressure (vacuum) in any portion of conduit 21 which might burst a pipe of water, hammer (or vacuum bubble) damage the impeller 21 or its connected generator (not shown).

In order to do this in the most optimal manner, it would be beneficial to have local pressure sensors (not shown) inside the various conduits so that a water pulse can be dynamically fine-tuned to be the least traumatic to the hardware and fish and repeatable.

Some readers may question how the fish 24a can survive such a flushing acceleration. Actually, since I are not only accelerating the fish but all the water immediately around it, the fish is bodily accelerated with a uniformly distributed load on all of its surfaces. The pressurization is uniform around the fish because the pressurization pulse, in some embodiments, travels slower than the speed of sound in the water. This is indeed supported by the fact that some fish which are lucky and avoid the turbine blades make it through turbines alive every day. Some flushed fish may be stunned but are expected to quickly recover.

There are several possible variations on the flush approach. It can be done with pulsed flow in 23a/23b as described above but it could also be done with constant circulating flow passing across 23a/23b. With a constant circulating cross-flow, one could flush by pulse-varying the constant cross-flow rate or even by dynamically aiming the cross-flow to hit (pass through) the fish-containing flush zone or the fish itself in conduit 22. A fast acting flow deflector might do this as well. An injected high-pressure gas bubble (e.g., steam, pressurized nitrogen or air) could also do it, provided the gas bubble is vented away from the turbine. In the extreme limit one may utilize explosive pressurization however some fish may be injured some of the time.

The system can be implemented with a 90 degree conduit orientation (not shown) as well; however, the depicted (45-30 degree) angled arrangement is employed in some embodiments as reducing the maximum stress or pressure variation the fish might feel at the moment of flushing. In fact, a 30 degree conduit joint would be even gentler on the fish than the shown 45 degree conduit and would provide a bigger flush zone 27. The flushing may be triggered in any manner including using any type of direct or indirect pressure-pulsing means such as a positive displacement stroke or an explosive, high pressure gas or steam activated pressurization possibly utilizing a pressurization isolation diaphragm to keep gases out of the flow(s). An explosive activation may stun the fish but typically not permanently harm the fish if the peak overpressure is modest. The acceptable overpressure (or underpressure) waveform will likely be a function of fish-type. I am particularly interested in Salmon protection at the time of writing.

The flush pulse may alternatively be generated by applying a vacuum or by allowing a water flow-blocking barrier to burst or break open. In any event, a near instantaneous pulse is caused at the appropriate time.

Given the huge amount of kinetic energy the water F1 has, and aims to keep, it takes considerable F2(t) pressure to cause effective flushing. In view of this, positive pressurization approaches may be employed in some embodiments over vacuum, negative pressure or burst-related release as they can reach much higher peak pressures if necessary. At the same time, the smaller angle (e.g., 30 degrees) intersections are employed in some embodiments as their flush events probably require less peak flushing pressure and have bigger flush zones 27.

I claim:

1. A system for reducing the severity of collisions taking place between windmill or wind-turbine blades, rotors or vanes and flying birds or avian species or flying species comprising:
   a wind turbine or windmill having moving or rotating members such as rotating blades, rotors or vanes;
   at least one large-area inflatable component comprising an inflatable membrane, inflatable bag or inflatable cushion which is mounted to or attached to a portion of at least one such moving or rotating member, rotor or blade;
   an avian-species collision-analysis system capable of contributing to the triggering or inflation of one or more such inflatable components in response to a conclusion or its conclusion that a collision between a member and a bird is imminent, likely, possible or even happening;
   the inflatable component being rapidly inflated at least partially before any likely blade or member collision is initiated, the inflated component presenting a cushioned impact surface for the bird upon or during such collision;
   the cushioned impact ameliorating the severity of a collision and allowing for the bird to survive at least some collisions on its own or with human care; and
   the inflated bag being soon deflated or replaced so as not to unacceptably interfere with continued turbine operation, stability or reliability.

2. The system of claim 1 wherein inflation is sourced from at least one of a) a pyrotechnic gas generator, or b) a high pressure gas reservoir or tank.

3. The system of claim 1 wherein inflation takes place in the milliseconds time regime.

4. The system of claim 1 wherein an inflatable bag or component thereof is at least somewhat elastomeric in nature.

5. The system of claim 1 wherein an inflatable bag or component thereof is at least partly polymeric in nature.

6. The system of claim 1 wherein an inflatable bag or component thereof is at least partially tear-resistant in nature.

7. The system of claim 1 wherein an inflatable bag or component thereof has low mass and inertia in a portion whereat that component portion is actually inflated.

8. The system of claim 1 wherein the collision-analysis system includes any type of imaging equipment, illuminator in the visible or infrared spectrum to illuminate the flying species, type of proximity detector including electromagnetic-field-perturbation-type non-imaging proximity detectors, distance-measurement sensor or trippable or interruptable electromagnetic beam, field or electromagnetic sheet, and that component or components are located anywhere.

9. The system of claim 8 wherein the component or components are located a) on a rotor blade, b) on a wind-turbine structure or tower, c) on the ground, d) in proximity to the wind turbine, e) on a neighboring wind turbine.

10. The system of claim 1 wherein the flying species collision analysis system includes any of a) a motion detection, b) a flying species recognition means, c) a species or bird distance measurement sensor or a bird size or mass estimator, d) consideration of both the rotor or blade speed and the bird's own velocity relative to the ground or rotor.

11. The system of claim 1 wherein a flying species detection, recognition or distance measurement component is mounted to one or more moving members, blades or rotors.

12. The system of claim 1 wherein an inflatable bag presents to a flying species a cushioned impact surface relative to a bare blade, cushioned meaning that any impact load is spread out more on the bird's body.

13. The system of claim 1 wherein an inflatable bag is inflated, at least in part, in a general inflation direction in which the underlying or supporting moving member, blade or rotor is also traveling or sweeping.

14. The system of claim 1 wherein an inflatable membrane or bag is arranged such that its inflating distension has a preferred or dominant direction.

15. The system of claim 1 wherein an inflatable components(s) is inflated upon any one or more of: a) on one moving member, b) on multiple moving members, c) on all moving members, d) at least on the potentially or predictably colliding member, e) on no members in the case of a close call not determined by the collision-analysis system to require bag inflation, f) on a leading face and/or edge of the moving member, g) inflated in a manner such that upon impact it can protectively wrap around a moving member edge.

16. The system of claim 1 wherein an inflatable component(s) is inflated and kept inflated for a period which: a) allows for a multiplicity of potential bird strikes to be avoided or ameliorated, b) allows for the rotor or blades to be slowed to further minimize potential harm to birds, the slowed rotor period not necessarily requiring continued full inflation or any continued inflation of the component(s).

17. The system of claim 1 wherein one or more components are inflated fast enough that substantial inflation takes place before most collisions actually occur.

18. The system of claim 1 wherein an inflated component has relatively low mass such that at least one of: a) its inertia is low thus its inflation velocity is high, b) its distending conforming momentum per unit area is low such that its distended physical impact upon the flying species will be mild compared to the unprotected-blade impact, despite the vector addition of both the bag velocity and the rotor velocity, c) a severity or frequency of bird deaths or injuries is ameliorated for at least some types of collisions.

19. The system of claim 1 wherein an impact between an inflated component and a flying species is markedly less severe than the same collision with a bare blade, severity being measured by any one or more of the extent of injury, the survivability of injury without human care, the survivability of injury with human care, or the frequency of immediate or near-immediate death.

20. The system of claim 1 wherein the system any one or more of: a) saves the flying species or bird's life, b) saves the flying species or bird from a critical or disabling injury, c) lessens the severity of an injury, d) allows for an opportunity for veterinary or animal health care to improve an outcome, e) informs a supervisor, animal care person or responsible party of any of a close or actual collision, f) collects data and/or images on either or both near collisions or actual collisions.

21. The system of claim 1 that also includes a cushioned wide-area net or other wide-area, soft-impact catchment underlying the turbine rotor blades, thus preventing further injury from ground impact or tower impact after the flying species collides with an inflatable bag.

22. The system of claim 1 wherein an inflatable bag is: a) inflated or distended in only one of its portions, surfaces, sides, faces or ends, b) inflated or distended over a portion smaller in size than the entire airbag body, c) inflated or not depending on a collision possibility or reality, d) inflated in a manner dependent on the geometry or kinetics aspect of the colliding entities.

23. The system of claim 1 wherein an uninflated airbag portion remains substantially anchored to, laminated to, adhered-to, clipped-to, captured-by or otherwise attached to the moving member while some other portion or portions are inflated or distended regardless of whether or not the member itself contributes to providing inflation gas containment.

24. The system of claim 1 wherein an inflatable membrane or bag contributes to forming a closed gas container, some portion of said gas container closure walls being: a) formed by a blade or rotor surface or component, b) comprised of airbag material laminated-to, bonded-to or fastened-to to a rotor or blade surface, c) airbag portions which face a blade or rotor, d) airbag portions which face a colliding bird, e) airbag portions which substantially face a swept path of a rotor or blade, f) airbag portions which distend or inflate somewhat beyond a lateral edge of a rotor or blade, g) airbag portions which assume a radius which is larger than a bare blade or rotor colliding edge radius.

25. The system of claim 1 wherein an inflatable membrane or bag is any one or more of: a) inflatable or deflatable at least once, b) inflatable multiple times, c) deflatable multiple times, d) inflatable and deflatable multiple times, e) resistant to puncture or tearing damage during flying species collisions, f) resistant to degrading sunlight or weather, g) resistant to any of thermal, tear or puncture damage caused by explosive inflation, particularly pyrotechnic explosion, h) designed to release a penetrating claw, talon or beak, i) a designed not to release a penetrating claw, talon or beak such that the blade or rotor can be stopped and the bird then carefully removed, j) a bag is replaceable after an inflation event.

26. The system of claim 1 wherein any of:
   (a) the system can condition or prepare the turbine mechanical machinery to minimize potential damage upon a collision, such as disengaging a rotor clutch, applying a rotor braking torque, or, in stuck-bird scenarios, stop the rotor for bird removal and care;
   (b) the system is controlled by one or more computer, PC or microcontroller;
   (c) the system has a communications link to centralized computing/analysis/storage equipment or has decentralized communications links among multiple turbines;
   (d) the system includes software in a readable medium for at least one of flying-species motion detection relative to the blades, flying-species position detection relative to the blades, flying-species distance relative to the blades, prediction of or calculation of likely bird/blade closure geometries and times, flying-species size, mass or wingspan, or even specific species or individual-bird recognition;
   (e) the system utilizes human-visible, camera-visible or bird-visible illumination;
   (f) the system utilizes infrared illumination of any type, constant or pulsed;
   (g) the system utilizes a proximity or distance detection means such as an electromagnetic, ultrasonic or optical proximity or distance measuring means;
   (h) the system records or detects any of images, distances, proximities, flying species images, collision images, close-call images, bird species types, incident particulars such as time, day, wind speed, temperature, luminosity, birds flying direction, birds estimated size/mass/wingspan, individual bird identity;
   (i) the system allows for the accumulation of a database of incidents and/or near-incidents; or
   (j) the system allows for open-access or controlled access over a network or the internet to its reported or reportable data.

27. The system of claim 1 wherein any flying species, bird detection or intrusion detection means—including system means or non-system means—are utilized to trigger any one or more of the following collision-avoidance measures irrespective of whether or not a bag inflation or collision actually takes place:
   (a) a warning or fright-based light, sound, smell, or image presented to the flying species or bird;
   (b) a physically repelling emission, including high-pressure, sprayed air or water directed at the flying species or bird; or
   (c) an irritating light, sound, smell or image presented to the flying species or bird.

28. The system of claim 1 wherein the inflating component provides one or more of the following collision-avoidance, or lessening of collision severity, measures:

(a) a rapidly inflating component creates a moving-air velocity near said bag or membrane which pushes the bird away from or aside from a collision, which is avoided;

(b) a rapidly inflating component creates an inflation sound which scares the bird away from or aside from a collision, which is avoided; or (c) a rapidly inflating component creates a visual warning near said bag or membrane which scares the bird away from or aside from a collision, which is avoided.

29. The system of claim 1 wherein a collision is avoided or lessened in severity because of any of:

(a) a warning or irritating light, sound, smell or image is presented to the flying species or bird;

(b) a repelling emission from such as a high pressure air nozzle or water spray nozzle is directed to the bird;

(c) a rapidly inflated bag or membrane provides a moving air velocity near said bag or membrane which pushes the bird away from or aside from a collision which is avoided;

(d) a rapidly inflated bag or membrane provides an inflation sound near said bag or membrane which warns or scares the bird away from or aside from a collision which is avoided;

(e) a rapidly inflated bag or membrane provides a bird-visual warning cue near said bag or membrane which warns or scares the bird away from or aside from a collision which is avoided; or (f) at least one moving member is visually patterned or colorized in a manner that reduces motion smear and/or improves the visibility of a moving blade for a flying species or bird, said actions (a)-(f) either being triggered by or provided by one or more inventive system(s) or being provided by another independent system in any switched or constant manner over time.

30. The system of claim 1 wherein said system is substantially self-contained in a new turbine as-installed, thus avoiding some or all of a field installation of the inventive system after a turbine is installed.

31. The system of claim 1 wherein said system is provided as a kit to a turbine maker, installer or maintainer.

32. The system of claim 1 wherein said system is provided as a retrofit kit for turbines which are already installed or are being installed.

33. The system of claim 1 wherein a government body, oversight body, utility, environmental agency or group, or official utilizes system data for any one or more purposes of:

(a) tracking collisions;
(b) tracking near collisions;
(c) tracking collision specifics including any of weather, time/day, season, specific turbine, turbine operational parameters, bird type, bird size/mass, bird velocity, blade or rotor angular position;
(d) siting turbines or relocating turbines at any site;
(e) approving, extending or terminating one or more turbine operating licenses at any site;
(f) tracking turbine uptime;
(g) tracking turbine downtime;
(h) calling or informing an animal care specialist of a collision;
(i) contributing considered or decision-supporting data to an environmental-impact statement for any site in any manner at any time;
(j) tracking avian populations, whether or not they are involved in actual collisions;
(k) tracking the behavior of specific species or individuals whether or not they are involved in actual collisions;
(l) tracking the cost or frequency of maintaining the system or of replacing consumed components such as membranes and inflation charges; or
(m) comparing turbine collisions or near-collisions at the same or different sites—including sites in other states or countries.

34. The system of claim 1 wherein the system is installed on or supporting two or more turbines and one or more of said system components may be provided centrally or in a single location at the multiturbine site, including a single supervisory controller or database.

35. The system of claim 1 including at least one computer-readable medium that is encoded with a set of instructions and data structure that execute on the real-time computational hardware of the system of claim 1, and that analyze the trajectory of a flying species relative to a moving member from at least image or proximity data and determining which of at least one of the following actions is taken: a) inflating one or more bags, b) scaring or warning the bird or c) activating a turbine or rotor clutch or brake.

36. The system of claim 35 wherein any of:

(a) data for storage and statistical analysis are passed to or from a network or the Ethernet or the Internet;
(b) data are searchable, savable, downloadable, lockable or made read-only;
(c) one or more responsible or interested persons are automatically informed or reported-to based on a system event or condition;
(d) the software is remotely updatable or serviceable;
(e) the software executes on real-time computation hardware; or
(f) the software is utilized in a distributed computing environment.

37. The system of claim 35, said instructions which calculate a two-or-more layered solution to the problem of avian collisions with the moving rotors or blades of wind turbine machines, the layering comprised of (a) a first collision-avoidance layer which avoids some collisions; and
(b) a second collision amelioration layer which allows some avian species to survive at least some unavoidable collisions, said collisions found to be unavoidable using the first layer.

38. The system of claim 1 that provides the means of detecting and responding to avian species about to be struck by moving wind-turbine members wherein imaging or proximity detection means is mounted to the moving member thereby simplifying the collision-likelihood computations or algorithms as only the potential avian is moving relative to said detector.

* * * * *